(12) United States Patent
Koprowicz et al.

(10) Patent No.: US 9,079,565 B2
(45) Date of Patent: Jul. 14, 2015

(54) PROGRESSIVE LOAD LIMITING RESTRAINT SYSTEM

(71) Applicant: Autoliv ASP, Inc., Ogden, UT (US)

(72) Inventors: Christopher Koprowicz, Macomb, MI (US); Thomas Garvey, Waterford, MI (US); Susan Richards, Sterling Heights, MI (US)

(73) Assignee: Autoliv ASP, Inc., Ogden, UT (US)

( * ) Notice: Subject to any disclaimer, the term of this patent is extended or adjusted under 35 U.S.C. 154(b) by 87 days.

(21) Appl. No.: 13/827,718

(22) Filed: Mar. 14, 2013

(65) Prior Publication Data

US 2014/0263797 A1 Sep. 18, 2014

(51) Int. Cl.
*B60R 22/28* (2006.01)
*B60R 22/46* (2006.01)

(52) U.S. Cl.
CPC ....... *B60R 22/4676* (2013.01); *B60R 2022/287* (2013.01); *B60R 2022/288* (2013.01)

(58) Field of Classification Search
CPC .............. B60R 22/341; B60R 22/4676; B60R 2022/287
USPC .......................... 242/379.1; 280/805; 297/472
See application file for complete search history.

(56) References Cited

U.S. PATENT DOCUMENTS

| | | | |
|---|---|---|---|
| 5,344,095 A | 9/1994 | Frei | |
| 5,522,564 A | 6/1996 | Schmidt et al. | |
| 5,526,996 A | 6/1996 | Ebner et al. | |
| 5,820,058 A | 10/1998 | Hirzel et al. | |
| 5,881,962 A | 3/1999 | Schmidt et al. | |
| 5,924,641 A | 7/1999 | Keller et al. | |
| 6,012,667 A | 1/2000 | Clancy, III et al. | |
| 6,029,924 A | 2/2000 | Ono et al. | |
| 6,105,893 A | 8/2000 | Schmidt et al. | |
| 6,105,894 A | 8/2000 | Singer et al. | |
| 6,241,172 B1 | 6/2001 | Fugel et al. | |
| 6,592,064 B2 | 7/2003 | Clute et al. | |
| 6,616,081 B1 | 9/2003 | Clute et al. | |
| 7,318,560 B2 | 1/2008 | Clute | |
| 7,374,122 B2 * | 5/2008 | Bell et al. | 242/379.1 |
| 7,954,854 B2 | 6/2011 | Keller et al. | |
| 2004/0227030 A1 | 11/2004 | Nagata et al. | |
| 2005/0178870 A1 | 8/2005 | Loffler et al. | |
| 2010/0013205 A1 * | 1/2010 | Keller et al. | 280/807 |
| 2010/0176236 A1 | 7/2010 | Clute et al. | |

FOREIGN PATENT DOCUMENTS

| | | |
|---|---|---|
| DE | 19681341 C1 | 4/1995 |
| DE | 10122910 | 5/2001 |
| DE | 10204477 A1 | 2/2002 |
| EP | 0627345 | 4/1994 |

* cited by examiner

*Primary Examiner* — Sang Kim
(74) *Attorney, Agent, or Firm* — Brinks Gilson & Lione

(57) ABSTRACT

A torsion bar having progressive load limiting characteristics for use in a vehicle restraint system is provided. The torsion bar includes a longitudinal main body portion having a first end for mounting to a belt retractor spindle and a second end for being engaged and disengaged with a seatbelt locking mechanism. The main body portion includes a longitudinal slot extending transversely therethrough that defines an opening therein. The torsion bar will twist in response to a first torsional load, which will cause the opening to become closed. When the opening becomes closed, the torsion bar with withstand twisting up to a second torsional load, where the torsion bar will twist again in response to the second torsional load.

18 Claims, 7 Drawing Sheets

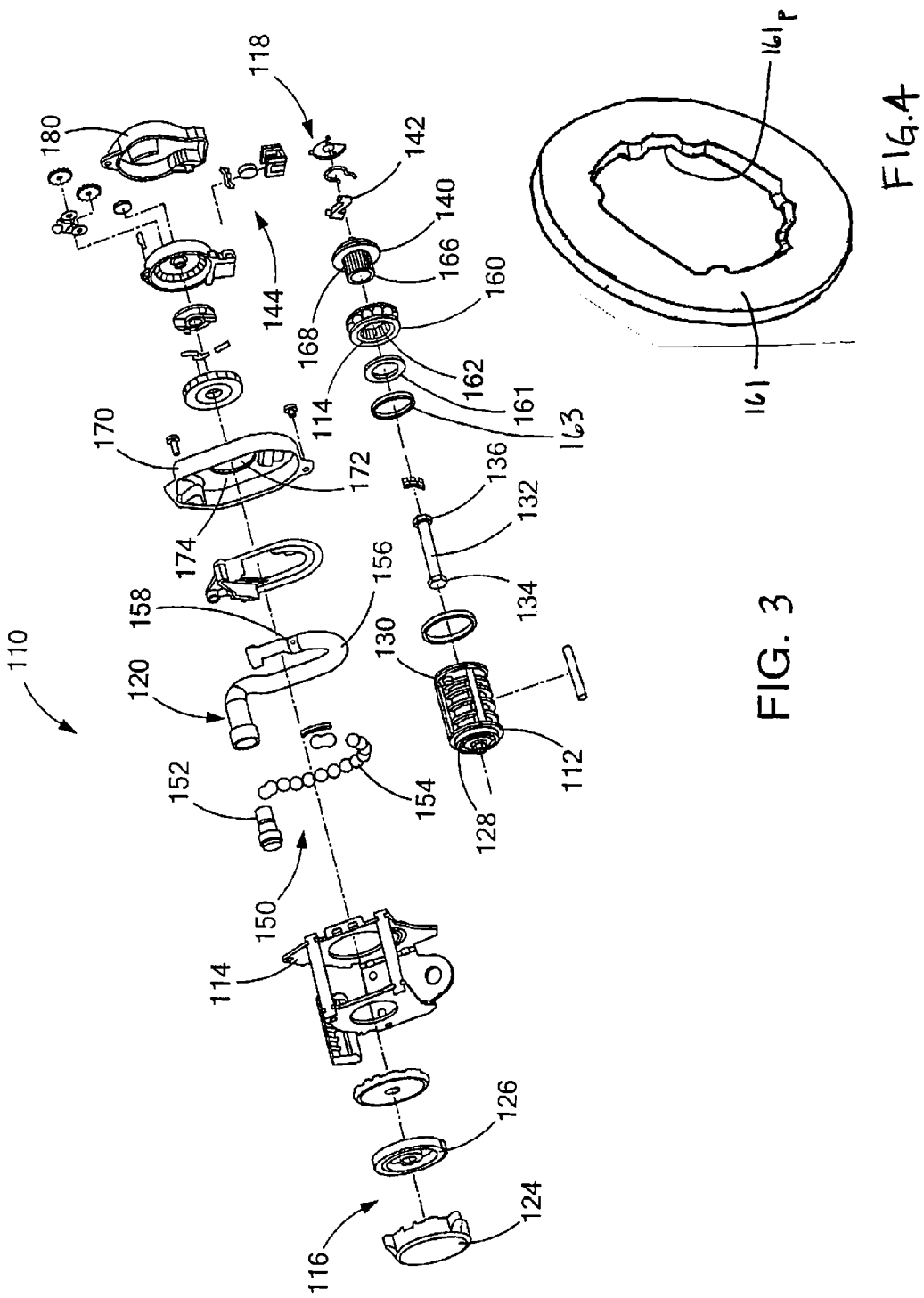

PROGRESSIVE LOAD LIMITING RESTRAINT SYSTEM

BACKGROUND

1. Field of the Invention

The present invention relates generally to seat belt restraint apparatus for restraining an occupant of an automobile, and more particularly relates to a seat belt retractor having a torsion bar with progressive load limiting characteristics.

2. Description of Related Art

Seat belt restraint systems for automobiles often include a locking mechanism, pretensioner, torsion bar, spool or spindle which is structured to lock and apply tension to the seat belt when an impact event such as an accident situation is detected. When the pretensioner is activated, the pretensioner eliminates any slack in the seat belt, and thus controls the physical space between the occupant and the seat belt. In this manner, the occupant of the seat is coupled with the seat belt as the occupant initially moves forward relative to the seat, thereby controllably restraining the occupant, reducing occupant excursion, and preventing undue loads when the occupant moves forwardly into the seat belt.

A retractor is another standard component of a seat belt restraint system which includes a spool receiving the webbing material of the seat belt, enabling retraction and extraction of the belt. The spool is used to wind up and store the webbing. Generally, the spool is locked in place upon detection at an impact situation in order to restrain the occupant via the seat belt. Recently, retractors have been designed having one or more force limiting elements which are structured to allow the spool to rotate and pay out the webbing material of the seat belt upon reaching predetermined belt tension force levels between the occupant and seat belt. In this manner, the restraint force imposed on the occupant can be limited in a controlled manner, thereby providing a certain load limitation characteristics.

One type of load limiting element for use with seat belt retractors is a torsion bar. A torsion bar is generally mounted between the spool or spindle of a belt retractor and a locking mechanism of a seat belt. In the event of a vehicle event causing a rapid deceleration, the locking mechanism can be actuated, either through the use of a controller that has sensed the event or through inertial forces. When the locking mechanism is actuated, the torsion bar and spindle attached thereto will be locked to prevent the seat belt from being extracted. The locked seat belt will cause a force to be exerted on the passenger by the belt, and the reaction force of the passenger against the belt will be transmitted back to the seat belt retractor. As force on the belt increases, the torsion bar will tend to twist, allowing the spindle to rotate slightly relative to the locking mechanism, thereby allowing a portion of the seat belt to be extracted. The extraction of the seat belt allowed by the twisting torsion bar will reduce the load exerted on the passenger by the belt.

A typical torsion bar acts to limit the load on the passenger in response to a single load level on the torsion bar being reached. To increase the number of load levels that can be reached where the load can be limited, one solution is to use multiple torsion bars mounted between the spindle and the locking mechanism. A first torsion bar can twist in response to a first load level exerted on the seatbelt, and a second torsion bar can subsequently twist in response to reaching a second load level. However, this solution can be undesirably costly to manufacture and time consuming to install.

Despite these and other improvements to automobile restraint systems, there remains a need to provide a retractor that includes a pretensioner while providing increased control and variation over the load limitation characteristics of the retractor system.

SUMMARY

A motor vehicle restraint system is provided, the system comprising: a bracket for being fixedly mounted to a vehicle seat; a spindle rotationally mounted to the bracket, the spindle having a seatbelt attached thereto; a locking mechanism mounted to the bracket; a torsion bar having a body portion with a first end fixedly mounted to the spindle, a second end for engaging with the locking mechanism, and a longitudinal central axis extending therealong; and a longitudinal slot extending through the body portion of the torsion bar and defining an opening therein.

In another form, the longitudinal slot is generally rectangular.

In another form, the longitudinal slot includes opposing longitudinal surfaces with the opening disposed therebetween.

In another form, the torsion bar is configured to twist from a first condition to a second condition in response to a torsional load applied thereto.

In another form, the opposing longitudinal surfaces contact each other when then torsion bar is in the second condition.

In another form, the locking mechanism engages the second end of the torsion bar in response to a load applied to the seatbelt by a passenger in the vehicle.

In another form, the torsion bar extends at least partially within the spindle.

In another form, the system further comprises a pretensioner operatively coupled to the torsion bar for causing the torsion bar and the spindle to rotate.

In another form, a torsion bar apparatus comprises: a main body portion having a central longitudinal axis; a first end of the main body portion for being fixedly mounted to a seatbelt retractor spindle; a second end of the main body portion for being engaged and disengaged with a locking mechanism; a slot extending through the main body portion transverse to the longitudinal axis; an opening defined by the slot for being compressed in response to a torsional force applied to the main body portion.

In another form, the slot includes a longitudinal length and a lateral width, and the length is greater than the width.

In another form, the slot is generally rectangular and includes opposing longitudinal surfaces.

In another form, the opposing surfaces will contact each other in response to a torsional load applied to the main body portion.

In another form, the main body portion has an open cross-section in a first condition.

In another form, the main body portion has a closed cross-section in a second condition.

In another form, the torsion bar will withstand a torsional load below a first predetermined level.

In another form, the torsion bar will twist in response to a torsional load above the first predetermined level.

In another form, the torsion bar will withstand a torsional load below a second predetermined level that is greater than the first predetermined level.

In another form, the torsion bar will twist in response to a torsional load greater than the second predetermined level.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 3 is an exploded view of the seat belt retractor in FIG. 1;

FIG. 4 is an enlarged view of a component of the seat belt retractor shown in FIG. 3;

DETAILED DESCRIPTION

Figure 1:
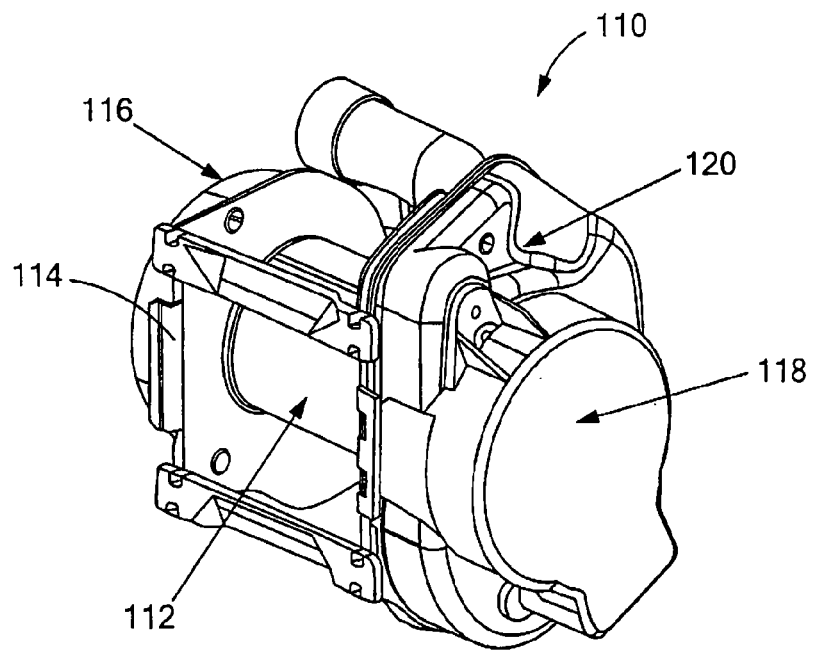
FIG. 1 is a perspective view of another embodiment of a seat belt retractor.
Figure 2:
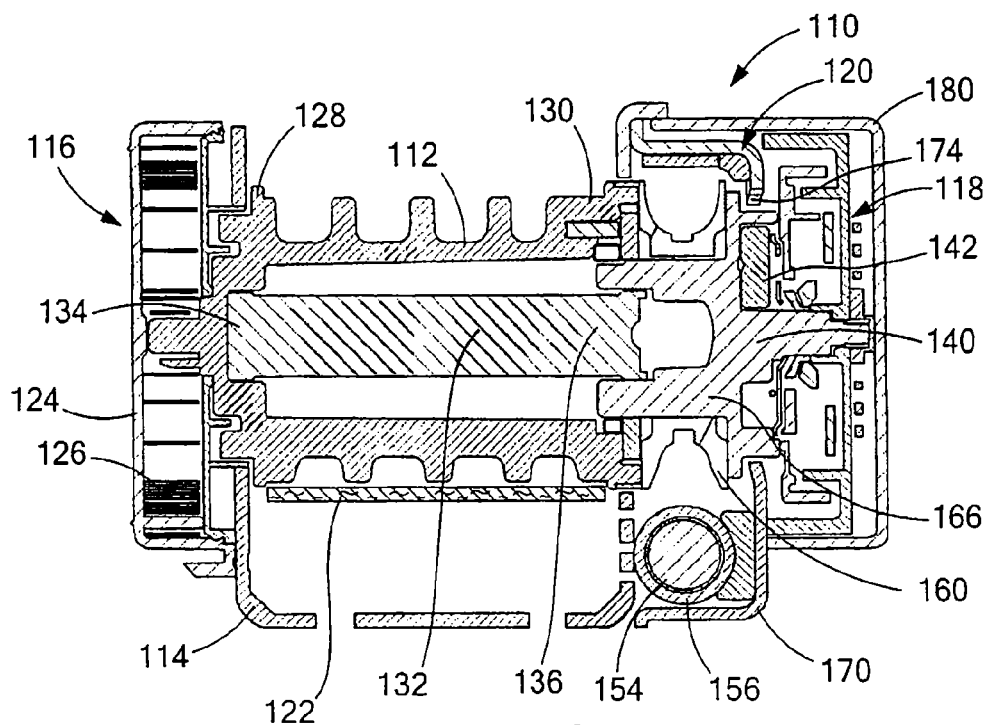
FIG. 2 is a cross-sectional view of the seat belt retractor of FIG. 1.
Figure 5:
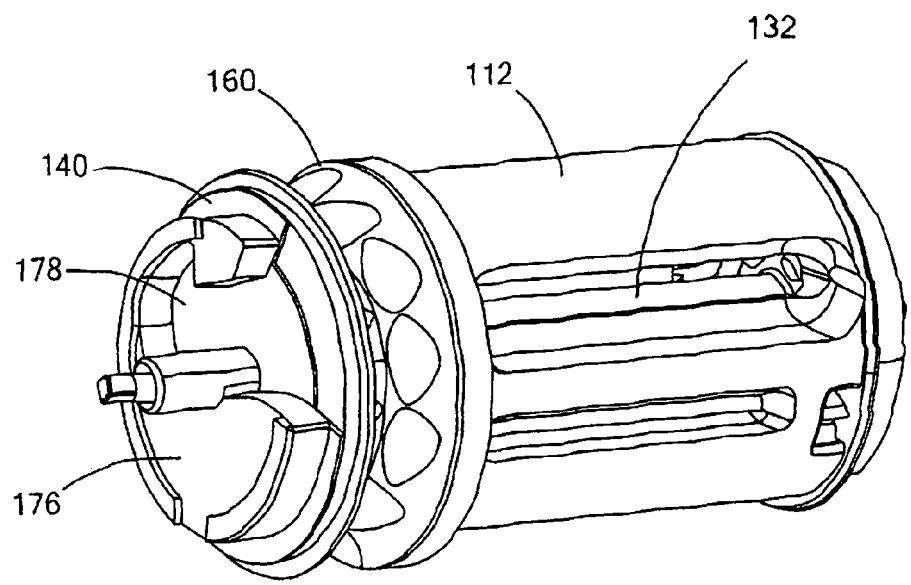
FIG. 5 is a perspective view of a portion of the seat belt retractor of FIG. 1.

Turning now to FIGS. 1 to 7, one embodiment of a retractor 110 includes a spindle 112 for receiving a portion of the seat belt 122 (FIG. 2). A retractor frame 114 locates and supports the spindle 112 with bearing surfaces so that the spindle 112 may rotate within the retractor frame 114. The spindle 112 rotates about an axis in a first direction for retraction and/or tightening of the seat belt 122 and alternatively, rotates in a second direction (e.g. opposed direction) for protraction of the seat belt 122. A rewind mechanism 116 includes a cap 124 enclosing a rewind spring 126 that is operatively connected to a first end 128 of the spindle 112 to wind up the seat belt 122 during normal operation, as is known in the art. At the side of the frame 114 opposite the rewind mechanism 116, a locking mechanism 118 is operable to generally fix rotation of the spindle 112, while a pretensioner 120 is operable to wind up the seat belt 122 onto the spindle 112, as will be discussed further hereinbelow.

The locking mechanism 118 and pretensioner 120 are operably coupled to the spindle 112 through a torsion bar 132, best seen in FIGS. 2 and 3. The torsion bar 132 includes a first end 134 splined directly to the spindle 112 for fixed rotation therewith. Opposite the first end 134 is a second end 136 of the torsion bar 132, and the locking mechanism 118 and pretensioner 120 control rotation of the spindle 112 via engagement with this second end 136. The torsion bar 132 is structured to operate as a load limiting element, whereby twisting of the torsion bar 132 may permit some unwinding or payout of the seatbelt 122 to limit the belt load on the vehicle occupant. While a torsion bar 132 has been depicted, numerous other load limiting elements may be employed, including tubes, sleeves, bending wires and the like, as will be appreciated by those skilled in the art.

As best seen in FIGS. 2 and 3, the second end 136 of the torsion bar 132 is splined to a tread head 140 for fixed rotation therewith. As indicated above, the locking mechanism 118 and pretensioner 120 operate through the torsion bar 132, and in particular through the tread head 140 connected to the second end 136 of the torsion bar 132. Notably in this example, the retractor locking mechanism 118 and the pretensioner 120 are disposed adjacent to each other and are arranged on the same side of the retractor frame 114. This configuration provides a more compact seatbelt pretensioner assembly and other benefits as previously discussed.

The locking mechanism 118 includes a lock dog 142 pivotally mounted to the tread head 140 for rotation relative thereto. The lock dog 142 is belt-sensitive, and rotates radially outwardly when the tread head 140 spins at a sufficient rate. The lock dog 142 selectively locks the tread head 140 and second end 136 of torsion member 132 during an impact event such as a vehicle collision, or upon sufficient deceleration of the vehicle, thereby providing an "emergency locking retractor" (ELR) function as is well known in the art. The locking mechanism 118 may also include a vehicle-sensitive actuator 144 in addition to or in place of the belt-sensitive mechanism described. Generally, in response to a change in vehicle attitude/acceleration, the actuator 144 operates to rotate the lock dog 142 to rotationally fix the tread head 140. A signal from the electric control unit may also be employed. Further details of such locking mechanisms may be found above and in U.S. Pat. Nos. 6,105,894, 6,592,064 and 6,616,081, the disclosures of which are hereby incorporated by reference in their entirety.

In the depicted embodiment, the locking mechanism 118 interacts with the cover 170 of the pretensioner 120, which has an opening 172 formed therethrough. A portion of the tread head 140 is disposed through the opening 172. The lock dog 142 is pivotally mounted within the recess 178 defined by the profiled end surface 176 of the tread head 140 (FIG. 5, discussed further hereinbelow), and disposed proximate the opening 172. As best seen in FIG. 3, the opening 172 has a perimeter with the retractor lock teeth 174 formed thereon. The lock dog 142 pivots to engage the retractor lock teeth 174 to selectively lock the tread head 140 to prevent protraction of the seatbelt 122.

Through blocking of the tread head 140, the spindle 112 is prevented from rotating to protract the seatbelt 122, thereby restraining the occupant. However, the retractor 110 and the torsion bar 132 also provide a load limitation function in order to limit the restraint force imposed on the occupant. Upon reaching a predetermined restraint force, the spindle 112 will begin to rotate and "pay out" the seat belt 122 by actuation of the torsion bar 132. That is, upon reaching a predetermined force, the torsion bar 132 will twist to allow some rotation of the spindle 112 relative to the tread head 140 (and hence relative to second end 136 of torsion bar 132) which is fixed by the retractor locking mechanism 118.

As previously indicated, the pretensioner 120 operates to wind up the seat belt 122 onto the spindle 112 to further restrain the occupant and take up any slack in the seat belt 122. The pretensioner 120 is activated by an electronic control unit (not shown) via a pretension signal. As best seen in FIGS. 2-6, the pretensioner 120 includes a drive mechanism 150 that is actuated to effectuate rotation of the spindle 112 via the torsion bar 132. In particular, the drive mechanism 150 preferably includes a gas generator 152 (e.g. a pyrotechnic charge), pretensioner balls 154 and a tube 156. The tube 156 has may be in the form of a roto tube which includes at least one looped configuration and an open end 158 opposite the gas generator 152. The pretensioner balls 154 serve as an actuating element are contained in the tube 156 and driven by the gas generator 152 past a drive wheel 160 positioned proximate the open end 158. The pretensioner is operable between an inactive state, where the pretensioner balls 154 are not engaged with the drive wheel 160, and an active state where the balls 154 engage the drive wheel 160 for transmitting force thereto.

Figure 6:
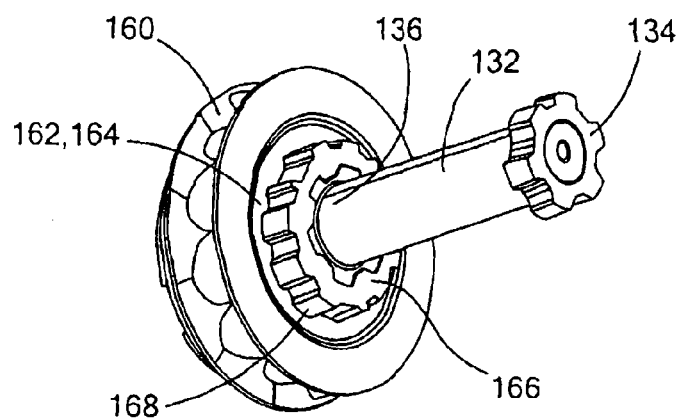
FIG. 6 is a different perspective view of a portion of the seat belt retractor of FIG. 1.

The drive wheel 160 (or other driven member of the pretensioner, depending on its design) is connected to the tread head 140 for fixed rotation therewith. In the depicted embodiment, and as best seen in FIGS. 3 and 6, the drive wheel 160 includes an opening 162 defining an interior engagement surface having a plurality of teeth 164. The tread head 140 correspondingly includes a main body 166 defining an exterior engagement surface having a plurality of teeth 168 structured to mate with the teeth 164 of the drive wheel 160. As such the drive wheel 160 is rotatably fixed to the tread head 140 for transmitting energy from the pretensioner 120 to the spindle 112 via the torsion bar 132. Preferably, the drive wheel 160 is located between the spindle 112 and the locking mechanism 118 (and the profiled end surface 176 of the tread head 140) as shown. Movement of the pretensioner balls 154 rotates the drive wheel 160, and due to the fixed rotational couplings, also rotates the spindle 112 via the tread head 140 and torsion bar 132. Maintenance of pressure on the pretensioner balls 154 in the active state (e.g., once the ball collection area is full) serves to block rotation of the drive wheel 160 in the unwind direction, and thus fixes the tread head 140 and second end 136 of the torsion bar 132, complimentary to and supplemental to the locking mechanism 118.

While this fixed rotational coupling via the teeth 164 and teeth 168 have been described, it will be recognized that the drive wheel 160 could also be coupled to the tread head 140 via a press-fit, a spline or other non-circular configuration of the main body 166 (of the tread head 140) and opening 162 in the drive wheel 160), or via a unitary construction of the tread head 140 and drive wheel 160 as a single piece. In these designs, there is no clutch (e.g. an on-clutch or off-clutch) or other operable mechanism that couples the pretensioner 120 to the torsion bar 132 and/or spindle 112. As such, the retractor design is much simpler and easier to manufacture, while still providing a locking function, a pretensioning function, and a load limitation function.

A suitable bearing 161, best seen in FIGS. 3 and 4, may be provided between the tread head/drive wheel 140/160 and the spindle 112 to control the friction therebetween. The bearing 161 includes a profiled aperture 161p that is structured to rotationally engage the main body 166 of the tread head 140. If desired, an anti-friction ring 163 (FIG. 3) may also be positioned around the exterior of the bearing 161 (or the annular surface of the bearing 161 may be coated), to further assist in reducing the friction.

As previously mentioned, the pretensioner 120 further includes a cover 170 for containing and locating many of the components of the pretensioner 170. The cover 170 defines an opening 172 defining an interior engagement surface having a plurality of teeth 174 for selectively engaging the lock dog 142 of the locking mechanism 118. The plurality of teeth 174 define a toothed gearing system that when engaged prevents unwinding of the spindle 112, but permits winding of the spindle 112 via over-ratcheting of the lock dog 142 along the teeth 174. As best seen in FIG. 6, the tread head 140 includes a profiled end surface 176 defining a recess 178 shaped to receive the lock dog 142 and permit rotation thereof for locking the tread head 140 to the cover 170. Although use of the pretensioner cover 170 to define the engagement surface for the locking mechanism 118 is preferred, a locking mechanism cover 180 (FIG. 3) or the frame 114 could be structured for engagement of the lock dog 142. Further details of the pretensioner 120 and its cover 180 may be found in U.S. patent application Ser. No. 12/195,591, filed Aug. 21, 2008, now U.S. Pat. No. 7,988,084, the disclosure of which is incorporated herein by reference in its entirety. Likewise, other pretensioner designs may be employed with the present invention, several exemplary pretensioners being disclosed in U.S. patent application Ser. No. 11/115,583, filed Apr. 27, 2005 and published as United States Publication No. US 2006/0243843, the disclosure of which is hereby incorporated by reference in its entirety.

Accordingly, it will be recognized by those skilled in the art that upon detection of an imminent impact event, or rapid deceleration of the vehicle, etc., the pretensioner 120 may be fired to rotate the drive wheel 160. Through its fixed rotational coupling, operation of the pretensioner in its active state causes rotation of the tread head 140, and hence the belt-sensitive lock dog 142 moves radially outwardly. Over-ratcheting of the lock dog along teeth 174 in the pretensioner cover 170 permits the spindle 112 to be rotated (via the torsion bar 132) to wind up the seat belt 122. Maintenance of the pressure on the pretensioner balls 154 effectively locks the drive wheel 160, and hence the tread head 140 and second end 136 of the torsion bar 132. At the same time, operation of the locking mechanism 118, either as a belt-sensitive or vehicle-sensitive controlled locking device, also serves to rotationally fix the tread head 140 and second end 136 of the torsion bar 132. When the pretensioner 120 has not fired or otherwise is in its inactive state, the pretensioner balls 154 do not engage the drive wheel 160, and hence the drive wheel 160 and tread head 140 are free to rotate. Thus, when the pretensioner 120 is in its inactive state, the locking mechanism 118 may still operate to rotationally fix the tread head 140. In this manner, the locking mechanism 118 and pretensioner 120 may be independently activated and operated, while also cooperating via the fixed rotational coupling of the tread head 140 and drive wheel 160 to supplement and/or back-up each other in locking the spindle 112 and activating the load limitation provided by torsion bar 132.

Figure 7:
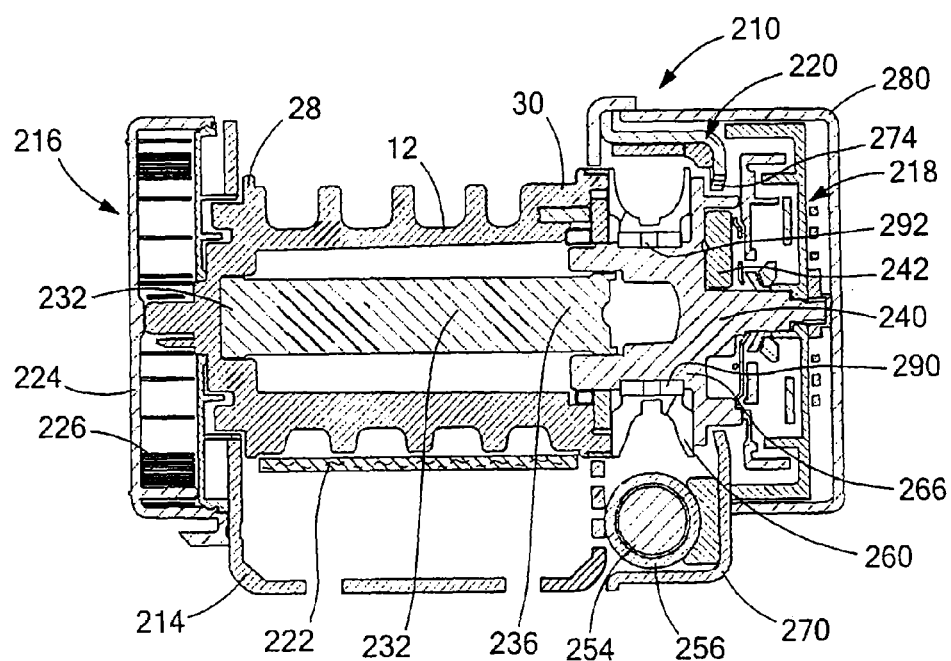
FIG. 7 is a cross-sectional view of another embodiment of a seat belt retractor.

Another embodiment of a retractor 210 having a pretensioner 220 is depicted in FIG. 7. This embodiment is substantially similar to the prior embodiment of FIGS. 1-6, but adds a clutch mechanism 290 between the pretensioner 220 and the spindle 212. As shown in FIG. 7, the pretensioner is coupled to the spindle 212 via the torsion bar 232 and tread head 240, and the clutch mechanism 290 selectively couples tread head 240 to the drive wheel 260 of the pretensioner 220. Additionally, the leading pretensioner balls 154 are provided in contact with the drive wheel 260 of the pretensioner 220. In normal operation, the clutch mechanism disengages the drive wheel 260 from the tread head 240 and spindle 212, such the seat belt 222 is free to wind and unwind from the spool 212 in normal operation of the retractor 210 and its other elements. During an emergency event or other event where the seat belt is desired to be tightened and wound upon the spool 212, the clutch mechanism 290 is activated to rotationally couple the drive wheel 260 to the tread head 240, preferably at about the same time or shortly prior to the activation of the pretensioner 220.

The clutch mechanism 290 may take many forms and include various coupling elements 292, such as rotatable coupling pawls, toothed gearing systems, rings, slidable or rotatable structures, and the like. The coupling elements may be driven mechanically or electronically, and preferably are linked to the activation of the pretensioner 220. For example, the pyrotechnic charge (e.g. 152) may also be used to drive the coupling element 292 of the clutch mechanism 290, or the coupling element 292 may be rotationally sensitive such that rotation of the drive wheel 260 of the pretensioner 220 activates the clutch, or an electronic signal (e.g. the signal that activates the pretensioner 220 or a separate signal) may be used to activate the coupling element 292 and the clutch mechanism 290. Further details of embodiments of suitable clutches are found in U.S. patent application Ser. No. 11/222,130 filed Sep. 8, 2005, the contents of which are incorporated herein by reference in their entirety.

Figure 8:
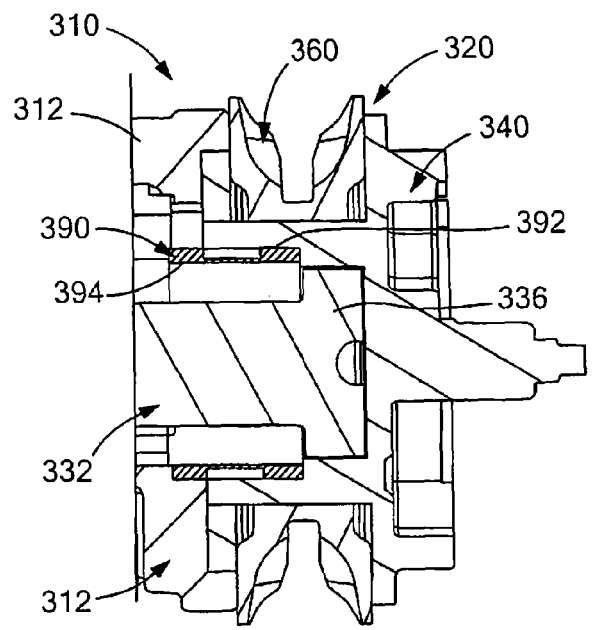
FIG. 8 is a partial cross-sectional view of yet another embodiment of a seat belt retractor.
Figure 9:
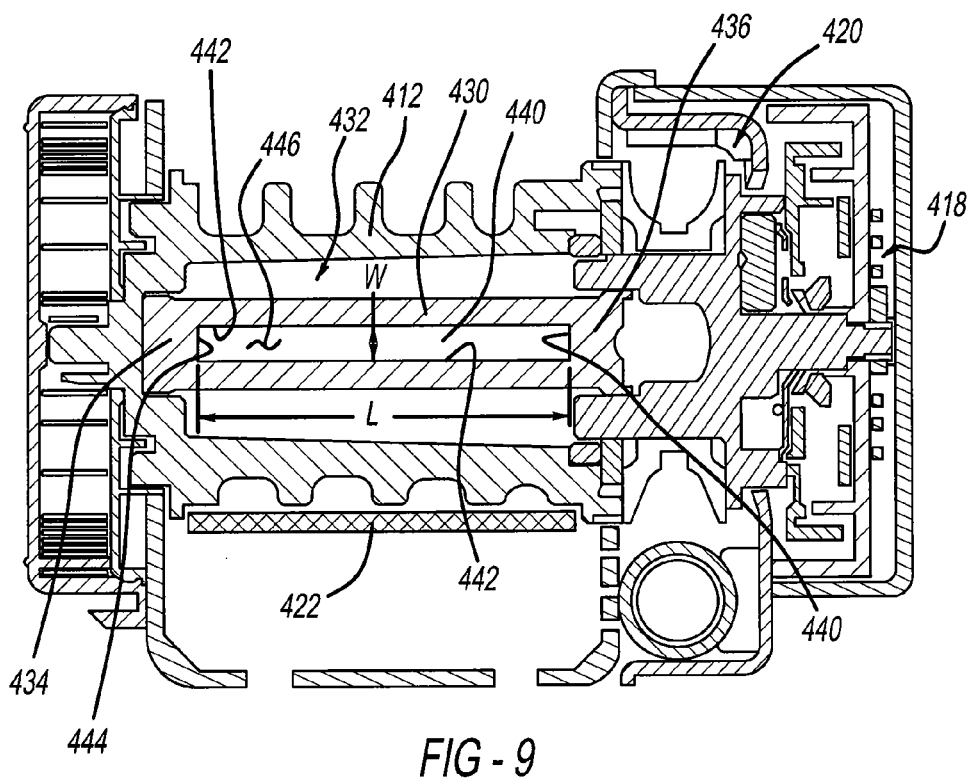
FIG. 9 is a cross-sectional view of yet another embodiment of a seat belt retractor.
Figure 10:
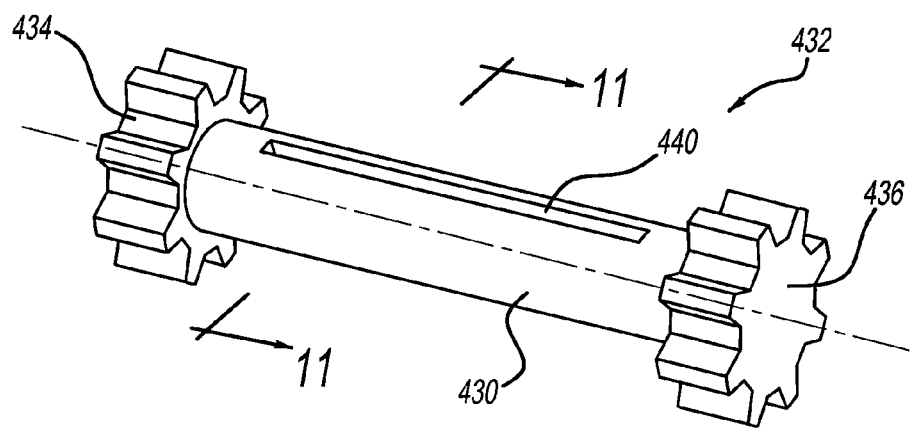
FIG. 10 is a isometric view of a torsion bar of the retractor of FIG. 9 in a first condition.
Figure 11:
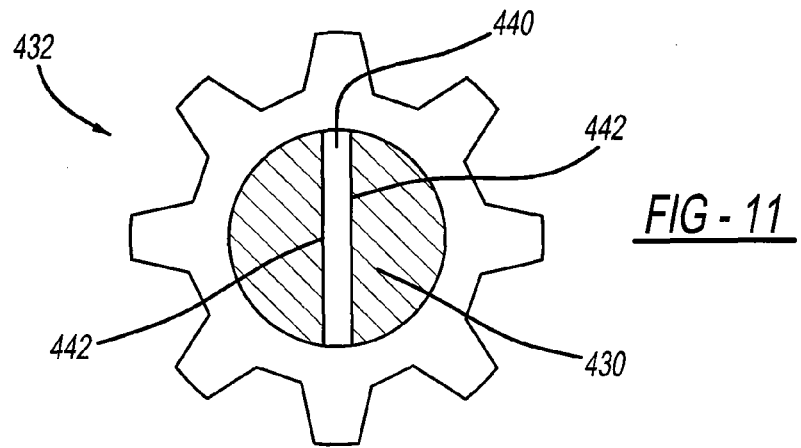
FIG. 11 is an isometric view the torsion bar in a second condition
Figure 12:
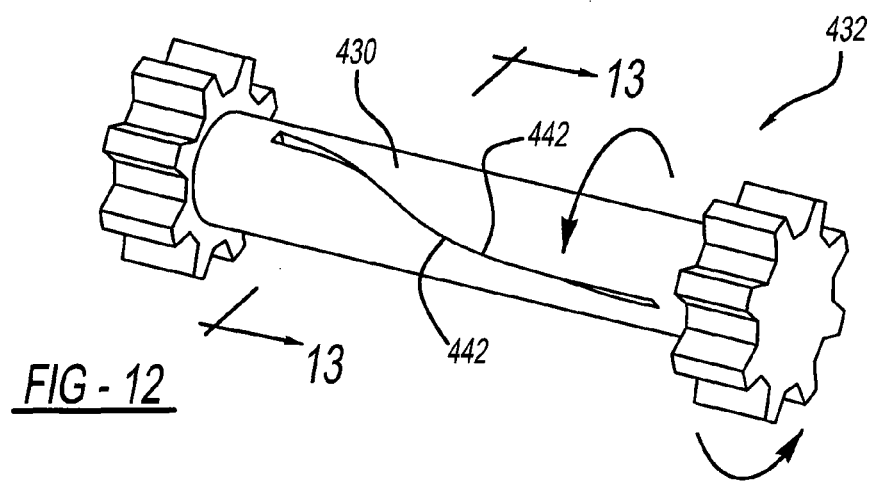
FIG. 12 is a cross-sectional view of the torsion bar in the first condition.
Figure 13:
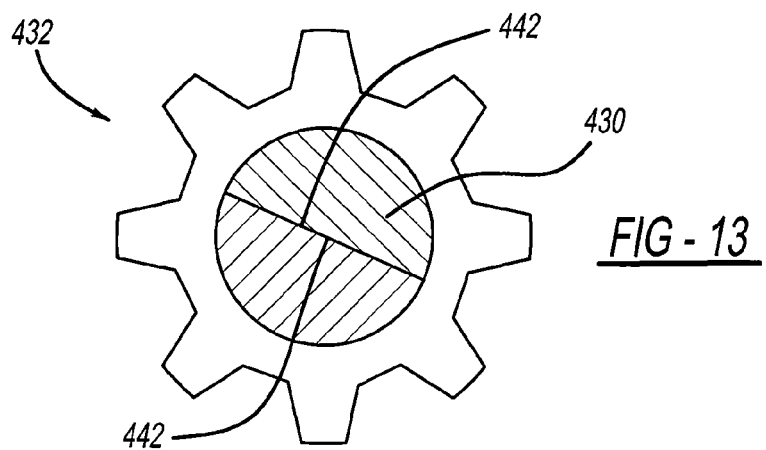
FIG. 13 is a cross-sectional view of the torsion bar in the second condition.

Another embodiment of a retractor 310 having a pretensioner 320 is depicted in FIG. 8. This embodiment is substantially similar to the prior embodiments of FIGS. 1-7, but includes a relatively short torsion pipe 390. The torsion pipe 390 is rotationally coupled to the tread head 340 at a first end 392 for fixed rotation therewith, and rotationally coupled to the spindle 312 at a second end 394 for fixed rotation therewith. Upon blocking of the tread head 340 (and hence the second end 336 of the torsions bar 332), either via the pretensioner or the locking mechanism, belt load is absorbed directly by the torsion pipe 390, which is structured to provide an immediate absorption of energy to quickly step down the high belt load (i.e. high load limitation) or a digressive load limitation, similar to the previously discussed digressive bending element 165. Upon the failure of the torsion pipe 390, load limitation is taken over by the torsion bar 332, which can provide a second load limitation characteristic. The second load limitation characteristic of the torsion bar can be low constant load limitation, digressive load limitation, have a stepped down load limitation, or otherwise be tuned as is known and will be readily appreciated by those skilled in the art.

In another form, with reference to FIGS. 9-14, a torsion bar 432 is provided having progressive load limiting characteristics. The torsion bar 432 can be used in many of the above embodiments to provide progressive load limiting functions, where the load on the belt can shift from a relatively low load limitation characteristic to a relatively high load limitation characteristic based on the shape of the torsion bar 432, as further described below.

Similar to the above embodiments, the torsion bar 432 can be mounted between a locking mechanism 418 and a spindle 412. The torsion bar 432 includes a first end or spindle end 434 splined directly to the spindle 412 for fixed rotation therewith. Opposite the first end or spindle end 434 is a second end or locking end 436 of the torsion bar 432, and the locking mechanism 418 and pretensioner 420 control rotation of the spindle 412 via engagement with this second end or locking end 436. The torsion bar 432 is structured to operate as a load limiting element, whereby twisting of the torsion bar 432 may permit some unwinding or payout of the seatbelt 422 to limit the belt load on the vehicle occupant.

During a rapid deceleration of the vehicle, the locking mechanism 418 can operate to restrict the rotation of the spindle 412 in the manner previously described above according the various embodiments.

In the case of a relatively low load exerted on the seatbelt 422 by the passenger during the a locked condition, such as a load below a first predetermined level, the torsion bar 432 and spindle 412 will generally not rotate and the seatbelt 422 will restrain the passenger without increasing its length. In this instance, the load on the passenger and on the seatbelt 422 will increase at a first rate indicated by sloped line A of FIG. 14.

In the case where the load on the seatbelt 422 is above the first predetermined level, the torsion bar 432 will twist a first rotational amount. When the torsion bar 432 twists, the spindle end 434 will rotate relative to the locking end 436, allowing the spindle 412 to rotate a small amount relative to the locking mechanism 16. The small amount of rotation by the spindle 412 will limit the reaction load that the seatbelt exerts back on the passenger. In this instance, the load on the passenger and the seatbelt 422 will generally be limited as indicated by the generally flat line B of FIG. 14.

When the load on the seatbelt 422 is between the first and second predetermined level, which is after the bar 432 has twisted the first rotational amount, the bar 432 will generally not twist, and the load on the passenger will increase. This is indicated by sloped line C of FIG. 14.

In the case where the load on the seatbelt 422 is above a second predetermined level that is higher than the first predetermined level, the torsion bar 432 will twist a second rotational amount after rotating the first rotation amount described above. The retractor end 434 will rotate relative to the locking end 436, allowing the spindle 412 to rotate an additional amount relative to the locking mechanism 418. This additional rotation will again limit the reaction load exerted back on the passenger by the seatbelt 422. In this instance, the load on the passenger and the seatbelt 422 will generally be limited as indicated by the generally flat line D of FIG. 14.

Figure 14:
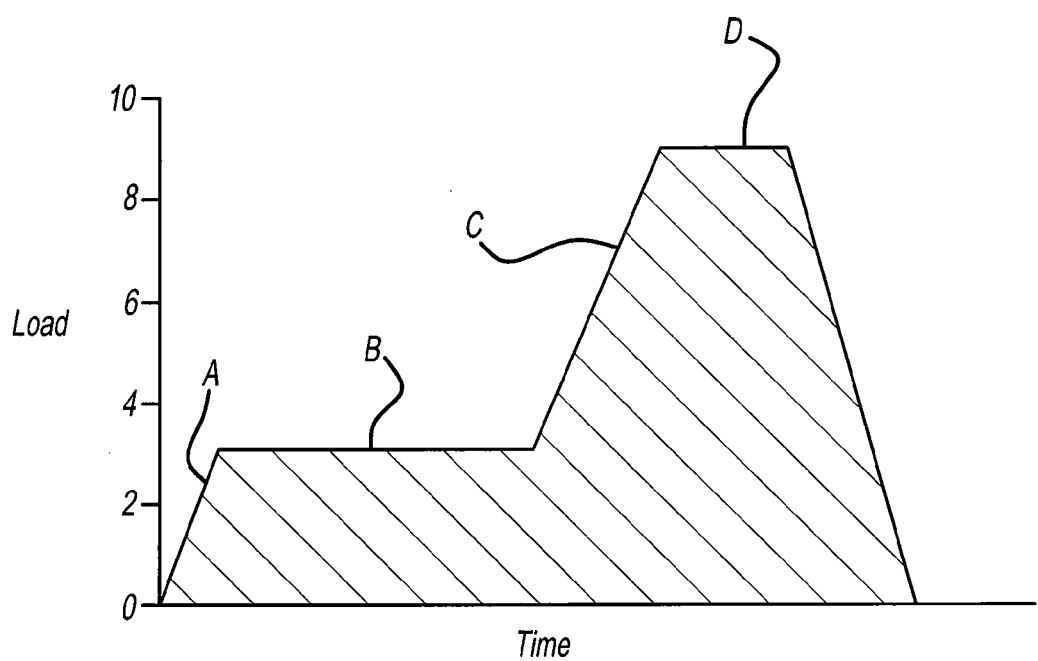
FIG. 14 is a graph illustrating the load limiting characteristics of the torsion bar.

It will be appreciated that the graph shown in FIG. 14 is of an idealized or conceptual nature, and that the actual performance of the torsion bar 432 and its effect on the load will not necessarily be in a straight line on the graph, or transition between lines at a precise point.

The above described progressive load limiting by the torsion bar 432 is the result of the cross-section of the torsion bar 432. The torsion bar 432 includes a body 430 having a generally cylindrical shape that extends between the ends 434 and 436. The torsion bar 432 includes a longitudinal central axis that extends through the center of the body 430. The body 430 includes a rectangular slot 440 that extends laterally therethrough and longitudinally therealong. The rectangular slot 440 includes a longitudinal length L and a width W.

The rectangular slot 440 includes a pair of opposing longitudinal surfaces 442 as well as opposing lateral surfaces 444. The surfaces 442 and 444 define an opening 446 therebetween that defines the size and shape of the rectangular slot 440.

As described above, the torsion bar 432 will generally withstand a torque acting thereon up to a first predetermined level. When the force on the belt 422 causes the torque on the torsion bar 432 to exceed the first predetermined level, the torsion bar 432 will twist, such that the ends 434 and 436 rotate relative to each other. As the torsion bar 432 twists, the surfaces 442 will move closer together, decreasing the size of the opening 446 therebetween. The opening 446 between the surfaces 442 allows the torsion bar 432 to twist in response to a lower torque than if there was no slot through a similarly sized torsion bar.

Once the torsion bar 432 has become sufficiently twisted, the surfaces 442 will contact each other, substantially eliminating the opening 446 therebetween. With the surfaces 442 contacting each other, the torsion bar 432 will generally withstand the torque applied thereto, thereby stopping the rotation of the spindle 412.

As the torque continues to increase and exceeds a second predetermined level, the torsion bar 432, having already twisted such that the surfaces 442 are contacting each other, will twist an additional amount.

The levels at which the torsion bar 442 will initially twist and then subsequently twist generally depend on the size and shape of the bar 442, as well as the size and shape of the rectangular slot 440 through the bar. For a given torsion bar size, increasing the size of the slot will 440 cause the torsion bar 432 to initially twist at a lower torque level due to a decreased amount of material in the body 430, and will allow the torsion bar 432 to twist in this condition a larger amount due to the increased size of the opening 446 between the surfaces 442. The relatively thinner body portion 430 will also cause the second twisting condition to occur at a lower torque. In this regard, a thinner rectangular slot 440, resulting in a torsion bar 432 with more material, will initially twist in response to a higher torque level, allowing a lesser amount of initial twisting, and will allow the second twisting condition to occur in response to a higher torque.

Increasing the length of the rectangular slot 440 will allow the initial twist to occur at a lower torque level, while decreasing the length of the rectangular slot 440 will increase the torque level necessary to create the initial twist.

Increasing the overall size of the torsion bar 432 but keeping the same ratio of bar size to slot size will result in similar ratios from stage to stage, but will require greater overall torque numbers due to the increased size.

In addition to changing the size and shape of the torsion bar 432 to alter the performance characteristics of the torsion bar 432, the material can also be altered. For example, the bar 432 could be made from various metals or alloys having different torsional strength characteristics. In another example, the bar 432 could undergo heat treatment or surface hardening. It will be appreciated by a person having skill in the art that various other alterations to the material of the torsion bar 432 can be performed to alter the torsional strength of the bar 432 that do not rise to the level of undue experimentation.

Thus, with reference to the above description, the torsion bar 432 can transfer from an open cross-section condition, where the slot 440 is open, to a closed cross-section condition, where the slot 440 is closed. These two conditions allow for the progressive load limiting characteristics described above.

The above described torsion bar 432 can be used in retractors having pretensioners as well as retractors without pretensioners, as well as other seat belt retractor designs that include a spindle and locking mechanism where the torsion bar can be mounted therebetween to transfer force between the locking mechanism and the seatbelt, thereby limiting the load exerted on the passenger by the seatbelt.

The features of the subject matter of this case as set forth in the herein above description, the patent claims, the summary, and the drawings, can be important individually or in desired combinations with one another in order to realize the invention in its various forms.

The present invention is, of course, in no way restricted to the specific disclosure of the specification and drawings, but also encompasses any modifications within the scope of the appended claims. The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A motor vehicle restraint system comprising:
a bracket for being fixedly mounted to a vehicle seat;
a spindle rotationally mounted to the bracket, the spindle having a seatbelt attached thereto;
a locking mechanism mounted to the bracket;
a torsion bar having a body portion with a first end fixedly mounted to the spindle, a second end for engaging with the locking mechanism, and a longitudinal central axis extending therealong; and
a longitudinal slot extending laterally through the entire body portion of the torsion bar and defining an opening therein.

2. The system of claim 1, wherein the longitudinal slot is generally rectangular.

3. The system of claim 1, wherein the longitudinal slot includes opposing longitudinal surfaces with the opening disposed therebetween.

4. The system of claim 3, wherein the torsion bar is configured to twist from a first condition to a second condition in response to a torsional load applied thereto.

5. The system of claim 4, wherein the opposing longitudinal surfaces contact each other when then torsion bar is in the second condition.

6. The system of claim 1, wherein the locking mechanism engages the second end of the torsion bar in response to a load applied to the seatbelt by a passenger in the vehicle.

7. The system of claim 1, wherein the torsion bar extends at least partially within the spindle.

8. The system of claim 1 further comprising a pretensioner operatively coupled to the torsion bar for causing the torsion bar and the spindle to rotate.

9. A torsion bar comprising:
a main body portion having a central longitudinal axis;
a first end of the main body portion for being fixedly mounted to a seatbelt retractor spindle;
a second end of the main body portion for being engaged and disengaged with a locking mechanism;
a slot extending laterally through the entire main body portion parallel to the longitudinal axis;
an opening defined by the slot for being compressed transverse to the longitudinal axis in response to a torsional force applied to the main body portion.

10. The torsion bar of claim 9, wherein the slot includes a longitudinal length and a lateral width, and the length is greater than the width.

11. The torsion bar of claim 9, wherein the slot is generally rectangular and includes opposing longitudinal surfaces.

12. The torsion bar of claim 11, wherein the opposing longitudinal surfaces contact each other in response to a torsional load applied to the main body portion.

13. The torsion bar of claim 9, wherein the main body portion has an open cross-section in a first condition.

14. The torsion bar of claim 13, wherein the main body portion has a closed cross-section in a second condition.

15. The torsion bar of claim 9, wherein the torsion bar withstands a torsional load below a first predetermined level.

16. The torsion bar of claim 15, wherein the torsion bar twists-in response to a torsional load above the first predetermined level.

17. The torsion bar of claim 16, wherein the torsion bar, upon twisting in response to the torsional load above the first predetermined level withstands a further torsional load below a second predetermined level that is greater than the first predetermined level.

18. The torsion bar of claim 17, wherein the torsion bar twists in response to a torsional load greater than the second predetermined level.

\* \* \* \* \*